(12) United States Patent
Huang

(10) Patent No.: US 8,736,279 B2
(45) Date of Patent: May 27, 2014

(54) ELECTRIC LEAKAGE DETECTION PROTECTIVE CIRCUIT WITH MAGNETIC LOCK MECHANISM

(76) Inventor: Huadao Huang, Yueqing (CN)

( * ) Notice: Subject to any disclaimer, the term of this patent is extended or adjusted under 35 U.S.C. 154(b) by 189 days.

(21) Appl. No.: 13/355,607

(22) Filed: Jan. 23, 2012

(65) Prior Publication Data

US 2012/0187958 A1     Jul. 26, 2012

(30) Foreign Application Priority Data

Jan. 25, 2011   (CN) .............................. 2011 0026636

(51) Int. Cl.
*H02H 3/16* (2006.01)
(52) U.S. Cl.
USPC ............................................ 324/557; 361/42
(58) Field of Classification Search
USPC ................ 324/557, 424; 361/42, 187; 335/18
See application file for complete search history.

(56) References Cited

U.S. PATENT DOCUMENTS

2007/0229202 A1*  10/2007  Gao ................................ 335/18
2009/0161271 A1*   6/2009  Huang et al. .................... 361/42

* cited by examiner

*Primary Examiner* — Arleen M Vazquez
*Assistant Examiner* — Brent J Andrews
(74) *Attorney, Agent, or Firm* — Mei & Mark LLP

(57) ABSTRACT

An electric leakage detection protective circuit comprises two normally closed switches. The live wire at the power output terminal is connected to the live wire output plug bush at the power output plug jack via a normally closed switch and constitutes a group of live wire conductors at the power output side; the neutral wire at power output terminal is connected to the neutral wire output plug bush at the power output plug jack via a normally closed switch and constitutes a group of neutral wire conductors at the power output side. When the outlet reset button is at either a trip position or a reset position, the power live wire output terminal is connected to the live wire output plug bush of the power output plug jack, and the power neutral wire output terminal is connected to the neutral output plug bush of the power output plug jack.

12 Claims, 4 Drawing Sheets

ELECTRIC LEAKAGE DETECTION PROTECTIVE CIRCUIT WITH MAGNETIC LOCK MECHANISM

CROSS-REFERENCE TO RELATED APPLICATIONS

This application claims the benefit of priority of Chinese patent application number 20110026636.X, filed on Jan. 25, 2011, which is incorporated by reference in its entirety.

TECHNICAL FIELD

This invention relates generally to an electric leakage detection protective circuit with a magnetic lock mechanism and wrong wiring prevention function installed into a power supply plug, outlet or circuit breaker with ground fault circuit interrupter function.

BACKGROUND

Along with the continuous development of outlets, plugs and switches with ground fault circuit interrupter function (GFCI), the requirements for function and operational safety of GFCI outlets and plugs are getting higher and higher, especially for American outlets and plugs.

American outlets are usually installed inside the wall, have one pair of power supply input wiring terminals to connect with the live wire and neutral wire in the wall, one pair of power supply output wiring terminals to connect the external power wire to put out the live wire and neutral wire, and several groups of power supply output holes to connect power supply plugs.

American outlets often have an electric leakage detection protective circuit inside, which can automatically cut off the power output of the outlet as protection when there is such fault as electric leakage, short circuit etc. in the power supply circuit. But some outlets have a defect in the design: when the installation personnel mistakenly connects the live wire and neutral wire inside the wall with the power output wiring terminals of the outlet, the electric leakage detection protective circuit inside the outlet cannot detect this fault of wrong wiring.

In case the user uses a mistakenly wired outlet, it may not function as electric leakage detection protection and there may be accidents of burning electric apparatus and electric shocks.

In addition, since an American outlet has one pair of power input wiring terminals, one pair of power output wiring terminals and at least one group of power output holes, there are at least three live wire conductors independent from each other and at least three neutral conductors independent from each other. When a reset button of an outlet is at a trip position, three live wire conductors are independent and disconnected from each other; when the reset button of the outlet is at a reset position, three live wire conductors are connected with each other via the circuit. Similarly, when the reset button of the outlet is at a trip position, three neutral conductors are independent and disconnected from each other; when the reset button of the outlet is at a reset position, three reset conductors are connected with each other via the circuit.

Owing to the compact size of power outlets, in order to realize the synchronous operation of three power conductors, rapid contact and cutout, and elimination of sparks, high requirement for fabrication process and high fabrication cost are required.

SUMMARY

For the above mentioned reasons, the inventor provides an electric leakage detection protective circuit with a simple structure. Such electric leakage detection protective circuit enables an outlet to have only two independent live wire conductors and two independent neutral conductors so as to substantially reduce the fabrication cost, simplify the fabrication process, extend the service life and increase the safety.

Another goal is to provide a new type of electric leakage detection protective circuit with a magnetic lock mechanism and wrong wiring prevention function.

In one embodiment an outlet has a test button, a reset button, a magnetic lock mechanism, a power output plug jack having a live wire output plug bush and a neutral wire output plug bush. An electric leakage detection protective circuit in the outlet comprises an induction coil to detect leakage current installed to a circuit board, a self-energizing coil to detect low resistance fault, a control chip, a silicon controlled rectifier, rectifier diodes, a resistor, a filter capacitor, a trip coil with a magnetic core inside, main circuit switches interlocked with the reset button and a switch interlocked with the test button or the reset button, a power output terminal having a power live wire output terminal with a live wire and a power neutral wire output terminal with a neutral wire, and two normally closed switches controlled by the electromagnetic lock mechanism in the outlet. The live wire of the power output terminal is connected to the live wire output plug bush of the power output plug jack via one normally closed switch and constitutes a group of power output side live wire conductors; the neutral wire of the power output terminal is connected to the neutral wire output plug bush of the power output plug jack through the other normally closed switch and constitutes a group of power output side neutral wire conductors. When the outlet reset button is at a trip position, the power live wire output terminal is connected to the live wire output plug bush of the power output plug jack, and when the reset button is at a reset position, the power live wire output terminal also is connected to the live wire output plug bush of the power output plug jack. When the outlet reset button is at a trip position, the power neutral wire output terminal is connected to the neutral output plug bush of the power output plug jack, and when the reset button is at a reset position, the power neutral wire output terminal also is connected to the neutral output plug bush of the power output plug jack.

In an alternative embodiment, the electric leakage detection protective circuit also includes a permanent magnet above or below the magnetic core in the trip coil which is aligned in line with it. The permanent magnet should maintain a certain distance with the magnetic core in the trip coil so that when there is no current in the trip coil, the magnetic core in the trip coil will not be drawn by the permanent magnet.

Additional objects and advantages of the invention will be set forth in part in the description which follows, and in part will be obvious from the description, or may be learned by practice of the invention. The objects and advantages of the invention will be realized and attained by means of the elements and combinations particularly pointed out in the appended claims.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate several embodiments, and, together with the description, serve to explain the principles of the power outlet safety shield device.

DESCRIPTION OF THE EMBODIMENTS

Reference will now be made in detail to the present exemplary embodiments, which are illustrated in the accompanying drawings. Wherever possible, the same reference numbers will be used throughout the drawings to refer to the same or like parts.

Figure 1:
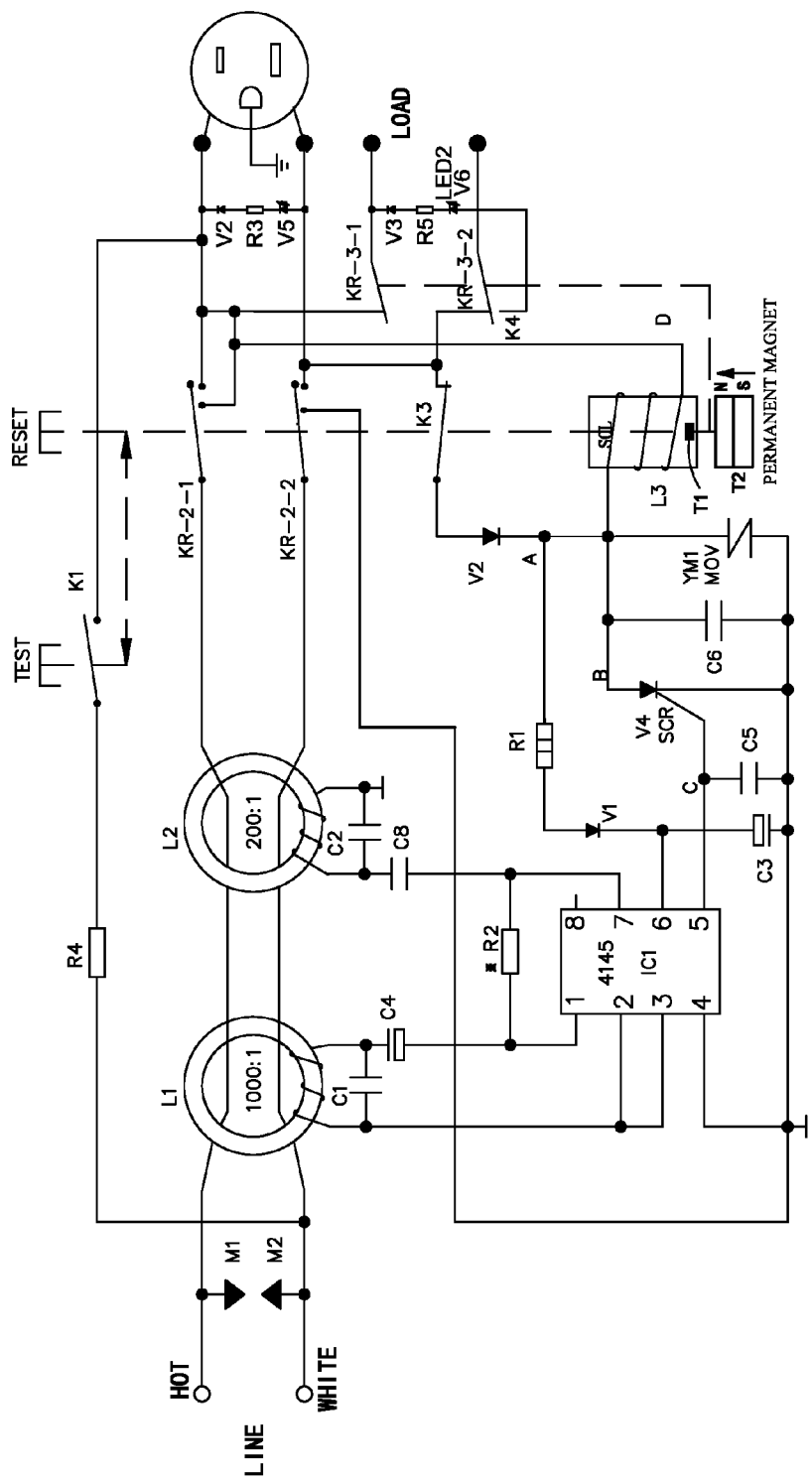
FIG. 1 is a circuit diagram of Embodiment 1 of the electric leakage detection protective circuit.

FIG. 1 is the detailed circuit diagram of Embodiment 1 of the electric leakage detection protective circuit. As shown in FIG. 1, a new type of electric leakage detection protective circuit with a magnetic lock mechanism mainly comprises induction coil L1 installed at the circuit board to detect leakage current, self-energizing coil L2 to detect low resistance fault, control chip IC1 (type: RV4145), silicon controlled rectifier (SCR) V4, rectifier diode V1, filter capacitor C3, trip coil SOL with magnetic core T1 inside, main circuit switches KR-2-1 and KR-2-2 interlocked with a reset button, wrong wiring alarm lamp LED2, power output indicator lamp LED1 (shown as V5) and switch K1 interlocked with a test button or the reset button.

The live wire HOT at power input terminal LINE passes through induction coil L1 to detect leakage current and self-energizing coil L2 to detect low resistance fault and then is connected to a live wire output plug bush at a power output plug jack via main circuit switch KR-2-1 interlocked with the reset button.

The neutral wire WHITE at power input terminal LINE passes through induction coil L1 to detect leakage current and self-energizing coil L2 to detect low resistance fault and then is connected to a neutral output plug bush at the power output plug jack via main circuit switch KR-2-2 interlocked with the reset button.

The electric leakage detection protective circuit with a magnetic lock mechanism also includes two normally closed switches KR-3-1 and KR-3-2 controlled by the electromagnetic lock mechanism in the outlet. The live wire at power output terminal LOAD is connected to the live wire output plug bush of the power output plug jack through normally closed switch KR-3-1 and constitutes a group of live wire conductors at the power output side; the neutral wire at power output terminal LOAD is connected to the neutral output plug bush of the power output plug jack through normally closed switch KR-3-2 and constitutes a group of neutral conductors at the power output side. When the outlet reset button RESET is at a trip position, the live wire output terminal is connected to the live wire output plug bush of the outlet plug jack. When the outlet reset button is at a reset position, the live wire output plug bush of the live wire output terminal also is connected to the live wire output plug bush of the outlet plug jack. Similarly, when the outlet reset button is at a trip position, the neutral wire output plug bush of the neutral output terminal is connected to the neutral wire output plug bush of the outlet plug jack and when the outlet reset button is at a reset position, the neutral wire output plug bush of the neutral output terminal also is connected to the neutral wire output plug bush of the outlet plug jack. Such design enables there being only input side live wire conductors and output side live wire conductors in the outlet, two live wire conductors in total and independent from each other; and only input side neutral wire conductor and output side neutral wire conductor in the outlet, two neutral wire conductors in total and independent from each other.

The signal output ends of induction coil L1 to detect leakage current and self-energizing coil L2 to detect low resistance fault are connected to detection signals input pin 1, 2, 3, 7 of control chip IC1 and control signal output pin 5 of control chip IC1 is connected to the gate of silicon controlled rectifier V4.

As indicated in FIG. 1, the anode of silicon controlled rectifier V4 is connected to live wire HOT of power input terminal LINE passing through induction coil L1 and self-energizing coil L2 via trip coil SOL and main circuit switch KR-2-1. The cathode of silicon controlled rectifier V4 is connected to neutral wire WHITE of power input terminal LINE passing through induction coil L1 and self-energizing coil L2 via main circuit switch KR-2-2.

Power input pin 6 of control chip IC1 is connected to live wire HOT of power input terminal LINE passing through induction coil L1 and self-energizing coil L2 via rectifier diode V1, resistor R1, trip coil SOL and main circuit switch KR-2-1. Work site input pin 4 of control chip IC1 is connected to neutral wire WHITE of power input terminal LINE passing through induction coil L1 and self-energizing coil L2 via main circuit switch KR-2-2.

When reset button RESET is at a trip position, as main circuit switches KR-2-1 and KR-2-2 both open, the elements as control chip IC1, silicon controlled rectifier V4, trip coil SOL, resistor, capacitor and etc. in the electric leakage detection protective circuit are all neutral, and the entire electric leakage detection protective circuit is neutral and in a power save mode. This design can further satisfy the energy saving and environmental requirement. Furthermore, as the control chip IC1, silicon controlled rectifier V4, trip coil SOL, resistor, capacitor and etc. in the electric leakage detection protective circuit are all neutral when the electric leakage detection protective circuit does not work, it increases the resistance to aging of the elements and thus extends the service life of the related elements and even the entire circuit.

When reset button RESET is pressed, main circuit switches KR-2-1 and KR-2-2 close, the power input terminal supplies work power for control chip IC1, silicon controlled rectifier V4, rectifier diode V1, resistor R1, filter capacitor C3 and trip coil SOL with a magnetic core inside, and the electric leakage detection protective circuit works with power. When reset button RESET is reset, main circuit switches KR-2-1 and KR-2-2 are still closed, the power input terminal still supplies work power for control chip IC1, silicon controlled rectifier V4, rectifier diode V1, resistor R1, filter capacitor C3 and trip coil SOL with the magnetic core inside.

As shown in FIG. 1, the electric leakage detection protective circuit with magnetic lock mechanism also includes one permanent magnet T2. This permanent magnet T2 is located below magnetic core T1 in trip coil SOL. Permanent magnet T2 and magnetic core T1 are aligned in a line. In addition, permanent magnet T2 should keep a certain distance with magnetic core T1 in trip coil SOL in order to ensure that when there is no current in trip coil SOL, magnetic core T1 in trip coil SOL will not be drawn by permanent magnet T2.

The electric leakage detection protective circuit with magnetic lock mechanism also has a normally closed switch K3 interlocked with reset button RESET. When reset button RESET is at a trip position, this normally closed switch K3 closes and when reset button RESET is pressed and at a reset position, this normally closed switch K3 opens. As indicated in FIG. 1, when trip coil SOL, diode V2 and normally closed switch K3 are in serial connection, one end is connected to live wire at power output terminal LOAD through normally closed switch KR-3-1 controlled by the electromagnetic lock mechanism in the outlet and the other end is connected to neutral wire at power output terminal LOAD through normally closed switch KR-3-2 controlled by the electromagnetic lock mechanism in the outlet and thus constitute a protective circuit with wrong wiring prevention function.

As indicated in FIG. 1, if installation personnel mistakenly connects the power live wire and neutral wire in the wall to power output terminal LOAD, because when the reset button RESET is at a trip position, normally closed switches KR-3-1, KR-3-2 and K3 all close, the power live wire in the wall will flow in from the power output terminal, and flow back to the power output terminal through closed normally closed switch KR-3-1, diode V2 connected to trip coil SOL with magnetic core inside, closed normally closed switch K3 and closed normally closed switch KR-3-2 and thus constituting a closed circuit. Therefore, trip coil SOL automatically generates a pulsating magnetic field coinciding with the magnetic field of permanent magnet T2 and drives magnetic core T1 in coil SOL to move toward permanent magnet T2 and to be drawn and firmly secured by permanent magnet T2. Magnetic core T1 in trip coil SOL is mated to the electromagnetic lock mechanism in the outlet. So the electromagnetic lock mechanism in the outlet moves and automatically cuts out normally closed switches KR-3-1 and KR-3-2 and disconnects the electric leakage detection protective circuit from the live wire and neutral wire in the wall. The plug jack at the outlet surface has no power output, and thus functions to prevent wrong wiring and to provide automatic protection. The moment the electromagnetic lock mechanism moves to disconnect normally closed switches KR-3-1 and KR-3-2, it closes main circuit switches KR-2-1 and KR-2-2, and has the power input terminal and the power output plug jack conductor connected as one entirety.

As indicated in FIG. 1, the electric leakage detection protective circuit also includes a normally open switch K4 controlled by the electromagnetic lock mechanism in the outlet. When wrong wiring alarm lamp LED2 is serially connected to resistor R5 and diode V3, one end is connected to the live wire at the power output terminal and the other end is connected to the neutral wire at the power output terminal via normally open switch K4. When the installation personnel mistakenly connects the live wire and neutral wire in the wall with power output terminal LOAD of the electric leakage detection protective circuit, the moment the electromagnetic lock mechanism in the outlet moves to cut out normally closed switches KR-3-1 and KR-3-2, it closes this normally open switch K4, the live wire in the wall connects with the neutral wire in the wall via diode V3, resistor R5 and wrong wiring alarm lamp LED2, and constitutes a closed circuit. When wrong wiring alarm lamp LED2 is ON, it means wrong wiring.

When installation personnel connects the live wire and neutral wire in the wall with the power input terminal correctly, main circuit switches KR-2-1 and KR-2-2 is interlocked with the reset button close, test button TEST is pressed via interlock, and switch K1 closes and produces simulated leakage current. Silicon controlled rectifier V4 is triggered and connected. The current flows in from D end of trip coil SOL via main circuit switch KR-2-1, flows out from A end of trip coil SOL and then flows back to the power input terminal through silicon controlled rectifier V4, main circuit switch KR-2-2. Meanwhile, the magnetic field generated by pulsating direct current flowing through trip coil SOL is opposite to that generated by permanent magnet T2, which reduces and eliminates the magnetic field effects. Magnetic core at trip coil SOL moves toward the direction opposite to the magnetic field generated by permanent magnet T2 and leaves from permanent magnet T2 thus achieving the purpose of magnetic unlock.

Because of the interlock between the reset button RESET and the test button TEST, pressing the reset button RESET downward causes the test button TEST to also move down. This allows the circuit to unlock when either the reset button RESET is pressed, or when the test button TEST is pressed. The interlock also enables the switch K1 to close when the reset button RESET is pressed, in addition to when the test button TEST is pressed.

When the outlet with the electric leakage detection protective circuit is delivered, permanent magnet T2 and magnetic core T1 in trip coil SOL are unlocked.

When installation personnel correctly connects the live wire and neutral wire in the wall to power input terminal LINE of the electric leakage detection protective circuit, presses reset button RESET, and pushes test button via interlock, main circuit switches KR-2-1 and KR-2-2 close so that there is power output at the jack at the outlet surface. Because switches KR-3-1 and KR-3-2 are normally closed switch, there is also power output at power output terminal LOAD.

The moment reset button RESET is pressed, main circuit switches KR-2-1 and KR-2-2 close, normally closed switch K3 opens, the live wire of power input terminal LINE passes through coils L1 and L2 and supplies work power for trip coil SOL, silicon controlled rectifier V4 and control chip IC1 via closed main circuit switches KR-2-1.

When installation personnel correctly connects the live wire and neutral wire in the wall to the power input terminal of the electric leakage detection protective circuit, reset button RESET is at a reset work mode. If there are such faults as leakage, short circuit, low resistance in the power supply circuit, induction coil L1 and self-energizing coil L2 sends out induction signal to control chip IC1, which sends out control signal from pin 5 so that silicon controlled rectifier V4 is connected and there is current in the trip coil. The trip coil produces magnetic field and magnetic core T1 in the trip coil moves toward the opposite direction of permanent magnet T2, the lock opens, the reset button trips and magnetic core T1 returns to the original place and thus opens main circuit switches KR-2-1 and KR-2-2 and disconnects the power output of the electric leakage detection protective circuit.

To indicate the work status, the electric leakage detection protective circuit also includes a power output indication circuit as shown in FIG. 1.

This power output indication circuit consists of power output indicator lamp LED1 (V5), diode V2 and current limiting resistor R3. When power output indicator lamp LED1 (V5), diode V2 and current limiting resistor R3 are in serial connection, one end is connected to the live wire output plug bush for the plug jack at the power output terminal and the other end is connected to the neutral wire output plug bush for the plug jack at the power output terminal. When the power output terminal of electric leakage detection protective circuit puts out power, power output indicator lamp LED1 (V5) is ON; otherwise power output indicator lamp LED1 (V5) is OFF.

In this embodiment, power output indicator lamp LED1 (V5) and wrong wiring alarm lamp LED2 are in two different colors.

Figure 2:
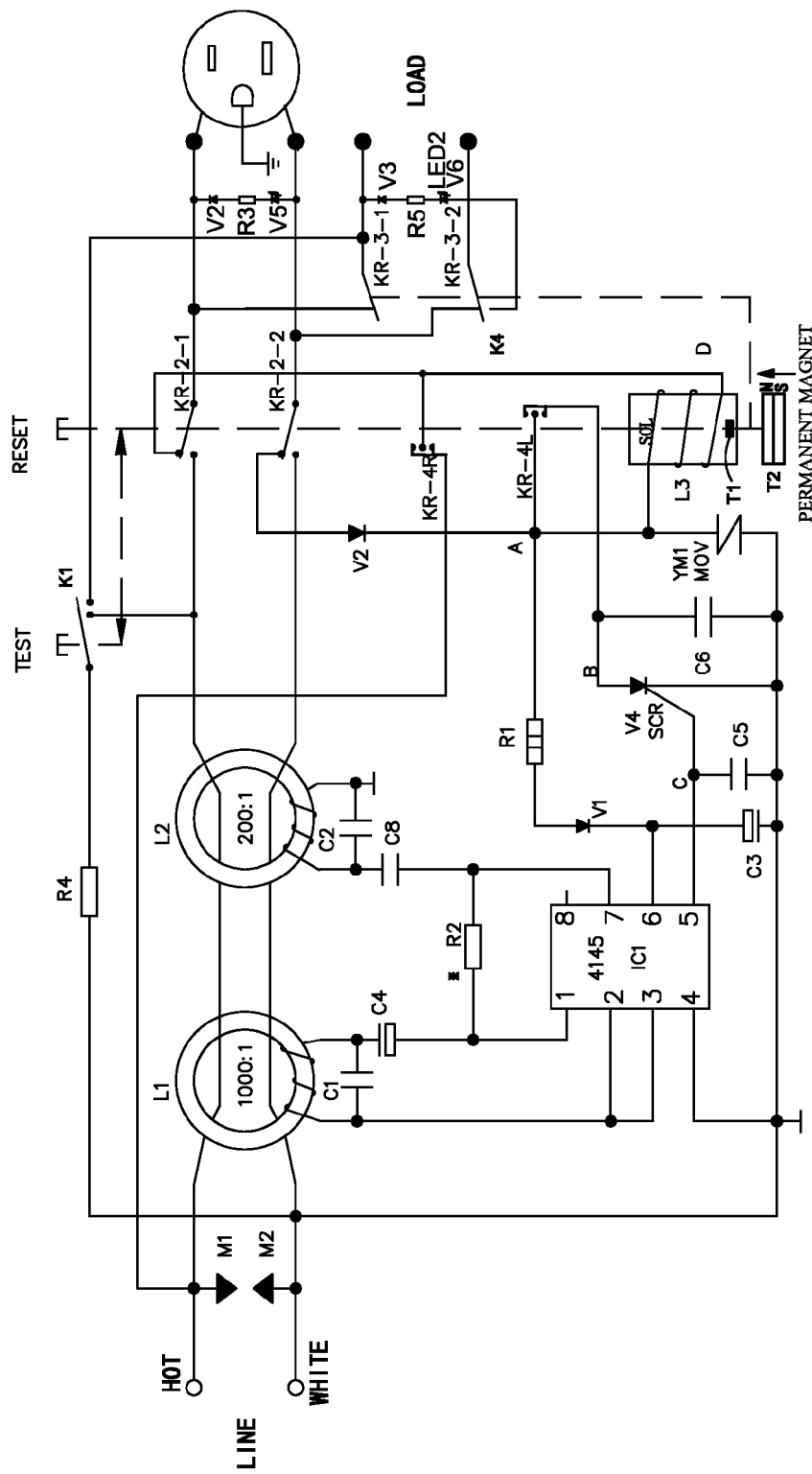
FIG. 2 is a circuit diagram of Embodiment 2 of the electric leakage detection protective circuit.

FIG. 2 is the detailed circuit diagram of Embodiment 2 of the electric leakage protective circuit. The electric leakage detection protective circuit shown in FIG. 2 also includes two normally closed switches KR-3-1 and KR-3-2 controlled by the electromagnetic lock mechanism in the outlet. The live wire at power output terminal LOAD is connected to the output plug bush of the power output plug jack via normally closed switch KR-3-1 and constitutes one group of live wire conductors at the power output side; the neutral wire of power output terminal LOAD is connected to the neutral output plug bush of the power output plug jack via normally closed switch KR-3-2 and constitutes one set of neutral conductors at the power output side. When outlet reset button RESET is at a trip position, the live wire output plug bush at the power live wire output terminal is connected to that of the power output plug jack, and when reset button is at a reset position, the live wire output plug bush at the power live wire output terminal also is connected to that of the power output plug jack. Similarly, when outlet reset button RESET is at a trip position, the neutral output plug bush at the power neutral wire output terminal is connected to that of the power output plug jack, and when reset button is at a reset position, the neutral output plug bush at the power neutral wire output terminal also is connected to that of the power output plug jack. Such design provides that there are only input side live wire conductor and output side live wire conductor in the outlet, two live wire conductors in total and independent from each other; and only input side neutral wire conductor and output side neutral wire conductor in the outlet, two neutral wire conductors in total and independent from each other.

Electric leakage detection protective circuit shown in FIG. 2 includes two power supply switches KR-4R and KR-4L. The anode of silicon controlled rectifier V4 is connected to live wire HOT of power input terminal LINE via power supply switch KR-4L, trip coil SOL and power supply switch KR-4R; power input pin 6 of control chip IC1 is connected to live wire HOT of power input terminal LINE via rectifier diode V1, resistor R1, trip coil SOL and power supply switch KR-4R.

When reset button RESET is at a trip position, as main circuit switches KR-4L and KR-4R both open, control chip IC1, silicon controlled rectifier V4, trip coil SOL, resistor, capacitor and etc. in the electric leakage detection protective circuit are all neutral, and the entire electric leakage detection protective circuit is neutral and in power save mode. This design can further satisfy the energy saving and environmental requirement. Furthermore, as control chip IC1, silicon controlled rectifier V4, trip coil SOL, resistor, capacitor and etc. in the electric leakage detection protective circuit are all neutral when the electric leakage detection protective circuit does not work, it increases the resistance to aging of the elements and thus extends the service life of the related elements and even the entire circuit.

When reset button RESET is pressed, main circuit switches KR-4L and KR-4R close, power input terminal supplies work power for control chip IC1, silicon controlled rectifier V4, rectifier diode V1, resistor R1, filter capacitor C3 and trip coil SOL with magnetic core inside, and the electric leakage detection protective circuit works with power.

When reset button RESET is reset, main circuit switches KR-4L and KR-4R still close, the power input terminal still supplies work power for control chip IC1, silicon controlled rectifier V4, rectifier diode V1, resistor R1, filter capacitor C3 and trip coil SOL with magnetic core inside.

As shown in FIG. 2, the electric leakage detection protective circuit with magnetic lock mechanism in Embodiment 2 also includes one permanent magnet T2. This permanent magnet T2 is located below magnetic core T1 in trip coil SOL and permanent magnet T2 and magnetic core T1 are aligned in a line, with pole N of permanent magnet T2 adjacent to magnetic core T1. In addition, permanent magnet T2 should keep a certain distance with magnetic core T1 in trip coil SOL in order to ensure that when there is no current in trip coil SOL, magnetic core T1 in trip coil SOL will not be drawn by permanent magnet T2.

As indicated in FIG. 2, one end of trip coil SOL is connected to the live wire of power output terminal LOAD via main circuit switch KR-2-1 and normally closed switch KR-3-1 controlled by the electromagnetic lock mechanism in the outlet, and the other end is connected to the neutral wire of power output terminal LOAD via diode V2, main circuit switch KR-2-2 and normally closed switch KR-3-2 controlled by the electromagnetic lock mechanism in the outlet and thus forming a protective circuit with wrong wiring prevention function.

As indicated in FIG. 2, if installation personnel mistakenly connects the power live wire and neutral wire in the wall to power output terminal LOAD, because when reset button RESET is at a trip position, normally closed switches KR-3-1, KR-3-2 both close, the power live wire in the wall will be connected to the power neutral wire in the wall via closed normally closed switch KR-3-1, one end of open main circuit switch KR-2-1, trip coil SOL, diode V2, one end of open main circuit switch KR-2-2 and closed normally closed switch KR-3-2 and thus constituting a closed circuit. Therefore, trip coil SOL generates a magnetic field with the same polarity attracting permanent magnet T2 and triggering the electromagnetic lock mechanism to automatically cut normally closed switches KR-3-1 and KR-3-2, and this disconnects electric leakage detection protective circuit from the live wire and neutral wire in the wall. The plug jack at the outlet surface has no power output, and thus functions to prevent wrong wiring and to provide automatic protection. The moment the electromagnetic lock mechanism moves to disconnect normally closed switches KR-3-1 and KR-3-2, it closes main circuit switches KR-2-1 and KR-2-2 and has the power input terminal and power output plug jack conductor connected as one entirety.

As indicated in FIG. 2, this Embodiment also includes a normally open switch K4 controlled by the electromagnetic lock mechanism in the outlet. When wrong wiring alarm lamp LED2 is serially connected to resistor R5 and diode V3, one end is connected to the live wire at the power output terminal and the other end connected to the neutral wire at the power output terminal via normally open switch K4. When the installation personnel mistakenly connects the live wire and neutral wire in the wall with power output terminal LOAD of the electric leakage detection protective circuit, the moment the electromagnetic lock mechanism in the outlet moves to cut out normally closed switches KR-3-1 and KR-3-2, it closes this normally open switch K4. The live wire in the wall connects with the neutral wire in the wall via diode V3, resistor R5 and wrong wiring alarm lamp LED2, and constitutes a closed circuit. When wrong wiring alarm lamp LED2 is ON, it means wrong wiring.

When installation personnel connects the live wire and neutral wire in the wall with the power input terminal correctly, as main circuit switches KR-2-1 and KR-2-2 are closed, pressing the reset button in order to press the test button TEST via interlock, switch K1, power supply switch KR-4R and KR-4L close and produce a simulated leakage current. Silicon controlled rectifier V4 is triggered and connected. The current flows in from D end of trip coil SOL via power supply switch KR-4R, flows out from A end of trip coil SOL and then flows back to the power input terminal through power supply switch KR-4L and silicon controlled rectifier V4. Meanwhile, the magnetic field generated by pulsating direct current flowing through trip coil SOL is opposite to that generated by permanent magnet T2, which reduces and eliminates the magnetic field effects. Magnetic core T1 at trip coil SOL moves toward the direction opposite to the magnetic field generated by permanent magnet T2 and leaves from permanent magnet T2 and thus achieves the purpose of magnetic unlock.

When the outlet with the electric leakage detection protective circuit is delivered, permanent magnet T2 and magnetic core T1 in trip coil SOL are unlocked.

When installation personnel correctly connects the live wire and neutral wire in the wall to power input terminal LINE of the electric leakage detection protective circuit, and presses reset button RESET, main circuit switches KR-2-1 and KR-2-2 close so that there is power output at the jack at the outlet surface. Because switches KR-3-1 and KR-3-2 are normally closed switches, there is also power output at power output terminal LOAD.

The moment reset button RESET is pressed, power supply switches KR-4R and KR-4L close, the live wire of power input terminal LINE supplies work power for trip coil SOL, silicon controlled rectifier V4 and control chip IC1 via closed power supply switches KR-4R and KR-4L.

When installation personnel correctly connects the live wire and neutral wire in the wall to the power input terminal of the electric leakage detection protective circuit, reset button RESET is in a reset work mode. That is, if there are such faults as leakage, short circuit, low resistance in the power supply circuit, induction coil L1 and self-energizing coil L2 sends out induction signal to control chip IC1, which sends out control signal from pin 5 so that silicon controlled rectifier V4 is connected and there is a current in trip coil. Trip coil produces magnetic field and magnetic core T1 in trip coil moves toward the opposite direction of permanent magnet T2, the lock opens, the reset button trips and magnetic core T1 returns to the original place and stops. And therefore, it opens main circuit switches KR-2-1 and KR-2-2 and disconnects the power output of the electric leakage detection protective circuit. Normally closed switches KR-3-1 and KR-3-2 connected to the output terminal are connected with the output plug jack conductor.

Figure 3:
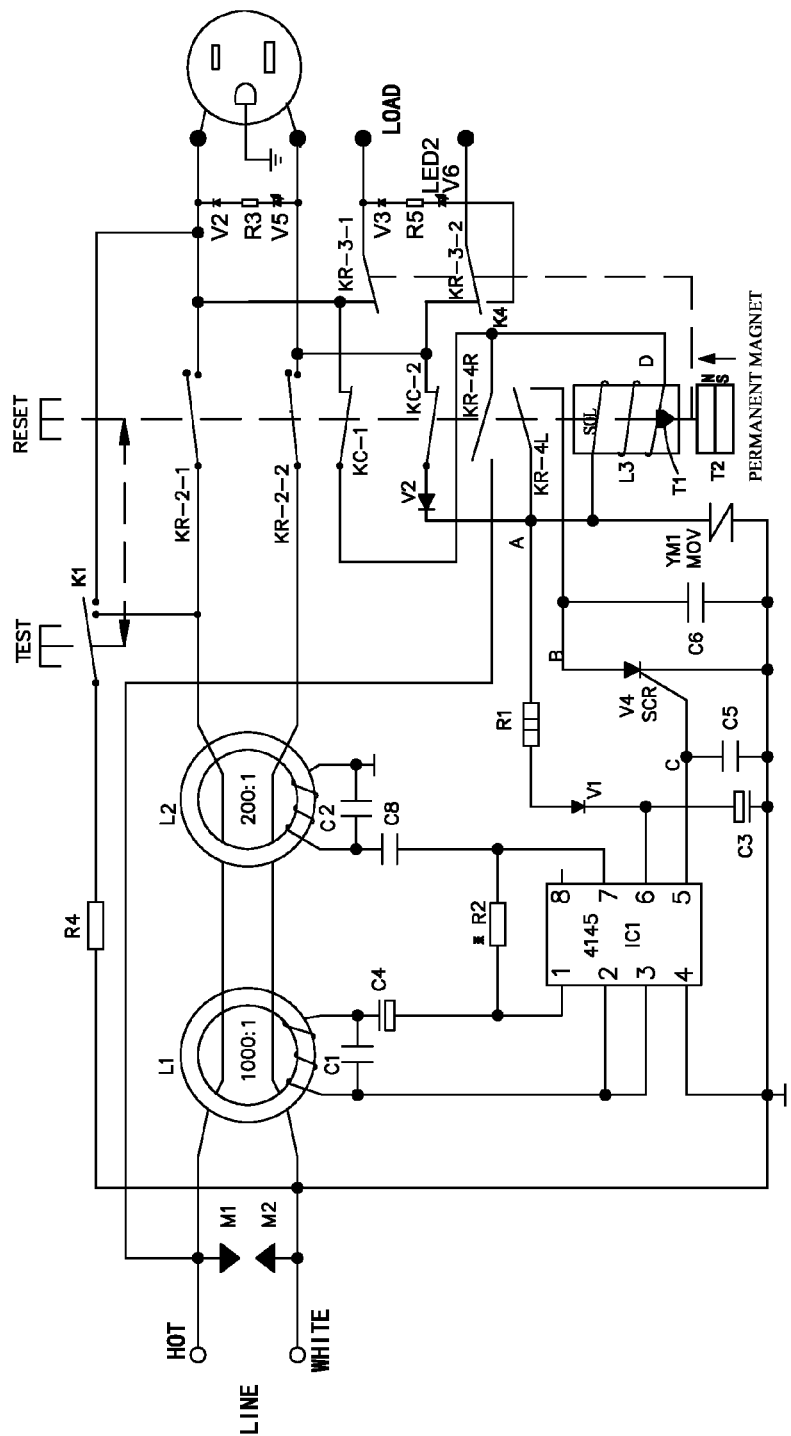
FIG. 3 is a circuit diagram of Embodiment 3 of the electric leakage detection protective circuit.

FIG. 3 is the detailed circuit diagram of Embodiment 3 of the electric leakage protective circuit. The electric leakage detection protective circuit shown in FIG. 3 also includes two normally closed switches KR-3-1 and KR-3-2 controlled by the electromagnetic lock mechanism in the outlet. The live wire at power output terminal LOAD is connected to the output plug bush of the power output plug jack via normally closed switch KR-3-1 and constitutes one group of live wire conductors at the power output side; the neutral wire of power output terminal LOAD is connected to the neutral output plug bush of the power output plug jack via normally closed switch KR-3-2 and constitutes one set of neutral conductors at the power output side. When outlet reset button RESET is at a trip position, the live wire output plug bush at the power live wire output terminal is connected to that of the power output plug jack, and when reset button is at a reset position, the live wire output plug bush at the power live wire output terminal also is connected to that of the power output plug jack. Similarly, when outlet reset button RESET is at a trip position, the neutral output plug bush at the power neutral wire output terminal is connected to that of the power output plug jack, and when reset button is at a reset position, the neutral output plug bush at the power neutral wire output terminal also is connected to that of the power output plug jack. Such design provides that there are only input side live wire conductor and output side live wire conductor in the outlet, two live wire conductors in total and independent from each other; and only input side neutral wire conductor and output side neutral wire conductor in the outlet, two neutral wire conductors in total and independent from each other.

The electric leakage detection protective circuit shown in FIG. 3 also includes two power supply switches KR-4R and KR-4L. The anode of silicon controlled rectifier V4 is connected to live wire HOT of power input terminal LINE via power supply switch KR-4L, trip coil SOL and power supply switch KR-4R. Power input pin 6 of control chip IC1 is connected to live wire HOT of power input terminal LINE via rectifier diode V1, resistor R1, trip coil SOL and power supply switch KR-4R.

When reset button RESET is at a trip position, as main circuit switches KR-4L and KR-4R both open, control chip IC1, silicon controlled rectifier V4, trip coil SOL, resistor, capacitor and etc. in the electric leakage detection protective circuit are all neutral, and the entire electric leakage detection protective circuit is neutral and in power save mode. This design can further satisfy the energy saving and environmental requirement. Furthermore, as control chip IC1, silicon controlled rectifier V4, trip coil SOL, resistor, capacitor and etc. in the electric leakage detection protective circuit are all neutral when the electric leakage detection protective circuit does not work, it increases the resistance to aging of the elements and thus extends the service life of the related elements and even the entire circuit.

When reset button RESET is pressed, power supply switches KR-4L and KR-4R close, the power input terminal supplies work power for control chip IC1, silicon controlled rectifier V4, rectifier diode V1, resistor R1, filter capacitor C3 and trip coil SOL with a magnetic core inside, and the electric leakage detection protective circuit works with power.

When reset button RESET is reset, power supply switches KR-2-1 and KR-2-2 and main circuit switches KR-4L and KR-4R still close, and KC-1 and KC-2 open, the power input terminal still supplies work power for control chip IC1, silicon controlled rectifier V4, rectifier diode V1, resistor R1, filter capacitor C3 and trip coil SOL with a magnetic core inside.

As shown in FIG. 3, the electric leakage detection protective circuit with a magnetic lock mechanism in Embodiment 3 also includes one permanent magnet T2. This permanent magnet T2 is located below magnetic core T1 in trip coil SOL and permanent magnet T2 and magnetic core T1 are aligned in a line, with pole N of permanent magnet T2 adjacent to magnetic core T1. In addition, permanent magnet T2 should keep a certain distance with magnetic core T1 in trip coil SOL in order to ensure that when there is no current in trip coil SOL, magnetic core T1 in trip coil SOL will not be drawn by permanent magnet T2.

As indicated in FIG. 3, the electric leakage detection protective circuit also includes two normally closed switches KC-1 and KC-2 interlocked with reset button RESET. One end of trip coil SOL is connected to the live wire of power output terminal LOAD via normally closed switch KC-1 and normally closed switch KR-3-1 controlled by the electromagnetic lock mechanism in the outlet, and the other end is connected to the neutral wire of power output terminal LOAD via diode V2, normally closed switch KC-2 and normally closed switch KR-3-2 controlled by the electromagnetic lock mechanism in the outlet and thus forming a protective circuit with wrong wiring prevention function.

As indicated in FIG. 3, if installation personnel mistakenly connects the power live wire and neutral wire in the wall to power output terminal LOAD, because when reset button RESET is at a trip position, normally closed switches KC-1, KC-2, KR-3-1, KR-3-2 all close, the power live wire in the wall will be connected to the power neutral wire in the wall via closed normally closed switch KR-3-1, normally closed switch KC-1, trip coil SOL, diode V2, closed normally closed switch KC-2 and closed normally closed switch KR-3-2 and thus constituting a closed circuit. Therefore, trip coil SOL generates a magnetic field attracting permanent magnet T2 and triggers the electromagnetic lock mechanism to automatically cut normally closed switches KR-3-1 and KR-3-2, and disconnects the electric leakage detection protective circuit from the live wire and neutral wire in the wall. The plug jack at the outlet surface has no power output, the wrong wiring switch K4 closes, and alarm lamp is ON to warn there is wrong wiring and provide automatic protection. The moment the electromagnetic lock mechanism moves to disconnect normally closed switches KR-3-1 and KR-3-2, it closes main circuit switches KR-2-1 and KR-2-2, and has the power input terminal and power output plug jack conductor connected as one entirety.

When installation personnel connects the live wire and neutral wire in the wall with the power input terminal correctly, then presses the reset button in order to close switches K1, KR-2-1, KR-2-2, KR-4R, KR-4L via interlock, switches KC-1 and KC-2 open at the same time. Switch K1 closes and produces a simulated leakage current. Silicon controlled rectifier V4 is triggered and connected. The current flows in from D end of trip coil SOL via power supply switch KR-4R, flows out from A end of trip coil SOL and then flows back to the power input terminal through power supply switch KR-4L and silicon controlled rectifier V4. Meanwhile, the magnetic field generated by pulsating direct current flowing through trip coil SOL is opposite to that generated by permanent magnet T2, which reduces and eliminates the magnetic field effects. Magnetic core T1 at trip coil SOL moves toward the direction opposite to the magnetic field generated by permanent magnet T2 and leaves from permanent magnet T2, achieving the purpose of magnetic unlock.

When the outlet with the electric leakage detection protective circuit is delivered, permanent magnet T2 and magnetic core T1 in trip coil SOL are unlocked.

When installation personnel correctly connects the live wire and neutral wire in the wall to power input terminal LINE of the electric leakage detection protective circuit, then presses reset button RESET, normally closed switches KC-1 and KC-2 open and main circuit switches KR-2-1 and KR-2-2 close so that there is power output at the jack at the outlet surface. Because switches KR-3-1 and KR-3-2 are normally closed switches, there is also power output at power output terminal LOAD.

The moment reset button RESET is pressed, power supply switches KR-4R and KR-4L close, the live wire of power input terminal LINE supplies work power for trip coil SOL, silicon controlled rectifier V4 and control chip IC1 via closed power supply switches KR-4R and KR-4L.

When installation personnel correctly connects the live wire and neutral wire in the wall to the power input terminal of the electric leakage detection protective circuit, reset button RESET is in a reset work mode. That is, if there are such faults as leakage, short circuit, low resistance in the power supply circuit, induction coil L1 and self-energizing coil L2 send out induction signal to control chip IC1, which sends out control signal from pin 5 so that silicon controlled rectifier V4 is connected and there is current in trip coil. Trip coil SOL produces magnetic field and magnetic core T1 in trip coil moves toward opposite direction of permanent magnet T2, the lock opens, the reset button trips and magnetic core T1 returns to the original place and stops. And therefore, it opens main circuit switches KR-2-1, KR-2-2, KR-4R, KR-4L and disconnects the power output of the electric leakage detection protective circuit. Normally closed switches KR-3-1 and KR-3-2 connected to the output terminal close.

Figure 4:
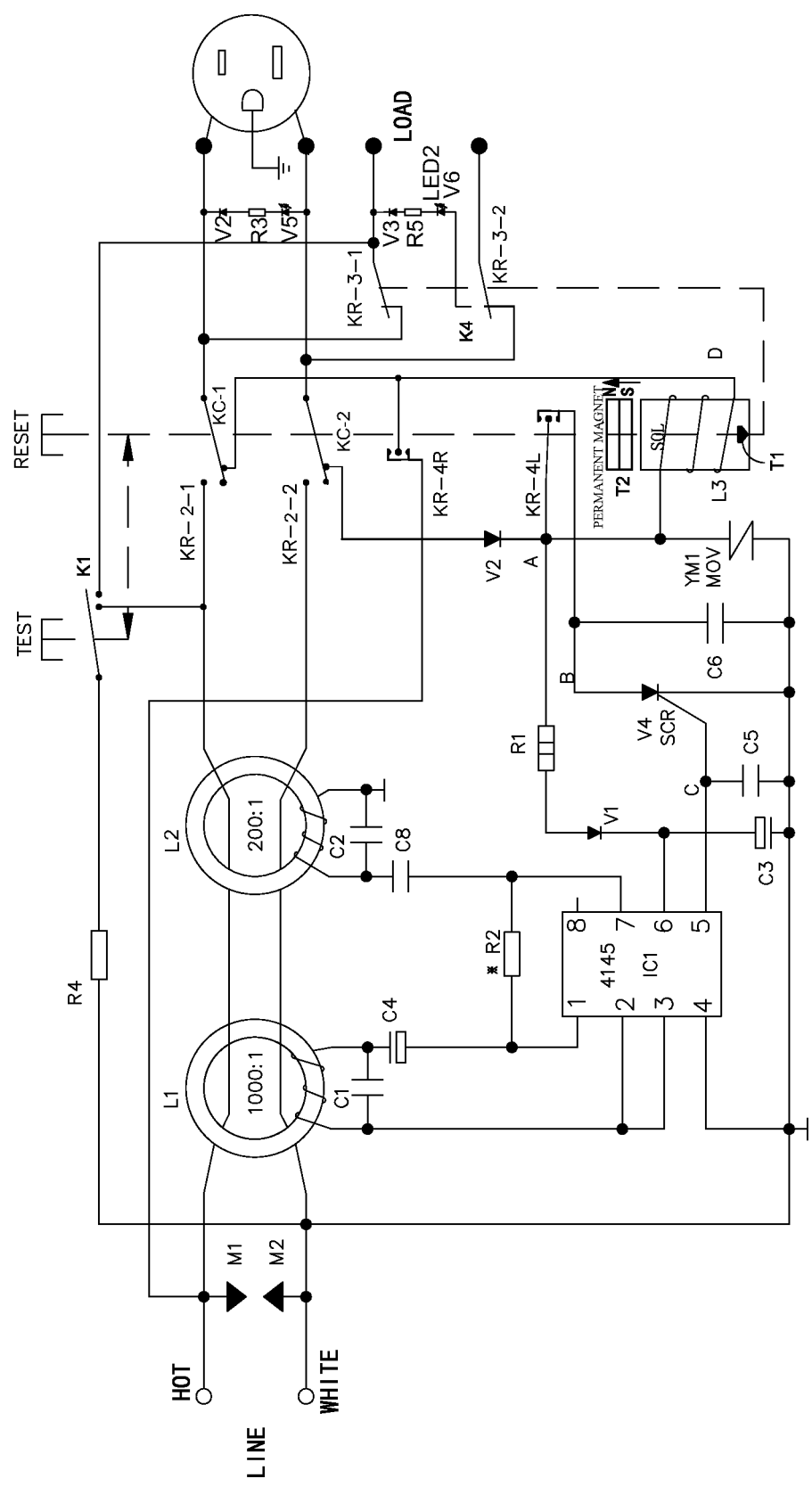
FIG. 4 is a circuit diagram of Embodiment 4 of the electric leakage detection protective circuit.

FIG. 4 is the detailed circuit diagram of Embodiment 4 of the electric leakage protective circuit The electric leakage detection protective circuit shown in FIG. 4 also includes two normally closed switches KR-3-1 and KR-3-2 controlled by the electromagnetic lock mechanism in the outlet. The live wire at power output terminal LOAD is connected to the output plug bush of the power output plug jack via normally closed switch KR-3-1 and constitutes one group of live wire conductors at the power output side; the neutral wire of power output terminal LOAD is connected to the neutral output plug bush of the power output plug jack via normally closed switch KR-3-2 and constitutes one set of neutral conductors at the power output side. When outlet reset button RESET is at a trip position, the live wire output plug bush at the power live wire output terminal is connected to that of the power output plug jack, and when reset button is at a reset position, the live wire output plug bush at the power live wire output terminal also is connected to that of the power output plug jack. Similarly, when outlet reset button RESET is at a trip position, the neutral output plug bush at the power neutral wire output terminal is connected to that of the power output plug jack, and when reset button is at a reset position, the neutral output plug bush at the power neutral wire output terminal also is connected to that of the power output plug jack. Such design provides that there are only input side live wire conductor and output side live wire conductor in the outlet, two live wire conductors in total and independent from each other; and only input side neutral wire conductor and output side neutral wire conductor in the outlet, two neutral wire conductors in total and independent from each other.

The electric leakage detection protective circuit shown in FIG. 4 also includes two power supply switches KR-4R and KR-4L. The anode of silicon controlled rectifier V4 is connected to live wire HOT of power input terminal LINE via power supply switch KR-4L, trip coil SOL and power supply switch KR-4R. Power input pin 6 of control chip IC1 is connected to live wire HOT of power input terminal LINE via rectifier diode V1, resistor R1, trip coil SOL and power supply switch KR-4R.

When reset button RESET is at a trip position, as main circuit switches KR-4L and KR-4R both open, control chip IC1, silicon controlled rectifier V4, trip coil SOL, resistor, capacitor and etc. in the electric leakage detection protective circuit are all neutral, and the entire electric leakage detection protective circuit is neutral and in power save mode. This design can further satisfy the energy saving and environmental requirement. Furthermore, as control chip IC1, silicon controlled rectifier V4, trip coil SOL, resistor, capacitor and etc. in the electric leakage detection protective circuit are all neutral when the electric leakage detection protective circuit does not work, it increases the resistance to aging of the elements and thus extends the service life of the related elements and even the entire circuit.

When reset button RESET is pressed, power supply switches KR-4L and KR-4R close, the power input terminal supplies work power for control chip IC1, silicon controlled rectifier V4, rectifier diode V1, resistor R1, filter capacitor C3 and trip coil SOL with the magnetic core inside, and the electric leakage detection protective circuit works with power.

When reset button RESET is reset, power supply switches KR-4L and KR-4R still close, and closed switches KC-1 and KC-2 open. The power input terminal still supplies work power for control chip IC1, silicon controlled rectifier V4, rectifier diode V1, resistor R1, filter capacitor C3 and trip coil SOL with the magnetic core inside.

As shown in FIG. 4, the electric leakage detection protective circuit with a magnetic lock mechanism in Embodiment 3 also includes one permanent magnet T2. This permanent magnet T2 is positioned below magnetic core T1 in trip coil SOL and permanent magnet T2 and magnetic core T1 are aligned in a line, with pole S of permanent magnet T2 adjacent to magnetic core T1. In addition, permanent magnet T2 should keep a certain distance with magnetic core T1 in trip coil SOL in order to ensure that when there is no current in trip coil SOL, magnetic core T1 in trip coil SOL will not be drawn by permanent magnet T2. The working theory is the same as the circuits shown in FIG. 1-3.

When the outlet with the electric leakage detection protective circuit is delivered, permanent magnet T2 and magnetic core T1 in trip coil SOL are unlocked.

When installation personnel correctly connects the live wire and neutral wire in the wall to power input terminal LINE of the electric leakage detection protective circuit, then presses reset button RESET, normally closed switches KC-1 and KC-2 open and main circuit switches KR-2-1 and KR-2-2 and power supply switch KR-4L and KR-4R close so that there is power output at the jack at the outlet surface. Because switches KR-3-1 and KR-3-2 are normally closed switches, there is also power output at power output terminal LOAD.

The moment reset button RESET is pressed, power supply switches KR-4R and KR-4L close, the live wire of power input terminal LINE supplies work power for trip coil SOL, silicon controlled rectifier V4 and control chip IC1 via closed power supply switches KR-4R and KR-4L.

When installation personnel correctly connects the live wire and neutral wire in the wall to power input terminal of the electric leakage detection protective circuit, reset button RESET is in a reset work mode. That is, if there are such faults as leakage, short circuit, low resistance in the power supply circuit, induction coil L1 and self-energizing coil L2 sends out induction signal to control chip IC1, which sends out control signal from pin 5 so that silicon controlled rectifier V4 is connected and there is current in trip coil. Trip coil SOL produces magnetic field and magnetic core T1 in trip coil moves toward the opposite direction of permanent magnet T2, the lock opens, the reset button trips and magnetic core T1 returns to the original place and stops. And therefore, it opens main circuit switches KR-2-1, KR-2-2, KR-4R, KR-4L and disconnects the power output of electric leakage detection protective circuit. Normally closed switches KR-3-1 and KR-3-2 connected to the output terminal close.

As above, advantages provided are that the magnetic lock mechanism of the electric leakage protective circuit is featured by simple structure, reliable operation and non self-destructive protection and reusability. One work principle is that in case the installation personnel incorrectly wires the circuit, the suction generated by the magnetic field generated by trip coil SOL has the same magnetism with permanent magnet T2, making magnetic core T1 in the trip coil draw together with the permanent magnet and lock so as to disconnect the power output. Only when the wiring is correctly connected and the leakage protection outlet is intact, pressing reset button RESET or pressing test button TEST will unlock the outlet. That is, the repulsive force between the magnetic field generated by the trip coil and the opposite magnetic field generated by the permanent magnet separates the magnetic core in the trip coil from the permanent magnet thus achieving unlocking And if only the reset button of the leakage protection outlet is pressed after unlocking, the reset button can be reset and there is power output from the electric leakage detection protective circuit.

Although this invention has been illustrated and described through the referenced preferable examples, the normal technicians of this domain shall understand that various modifications can be made in form and details within the scope of the claims without being limited by the descriptions of the above examples. For example, the permanent magnet (T2) can be mounted above or below the magnetic core (T1) in any of Embodiments 1-4.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

I claim:

1. An electric leakage detection protective circuit connected with an outlet which has a test button, a reset button, an electromagnetic lock mechanism, a power output plug jack having a live wire output plug bush and a neutral wire output plug bush, the circuit comprising:
   a permanent magnet;
   an induction coil for detecting leakage current;
   a self-energizing coil for detecting low resistance fault;
   a control chip;
   a silicon controlled rectifier;
   a first rectifier diode and a second rectifier diode;
   a resistor;
   a filter capacitor;
   a trip coil with a magnetic core inside;
   a power output terminal having a power live wire output terminal with a live wire and a power neutral wire output terminal with a neutral wire;
   a first main circuit switch and a second main circuit switch, each interlocked with the reset button;
   a switch interlocked with at least the reset button; and
   a first normally closed switch and a second normally closed switch, each controlled by the electromagnetic lock mechanism in the outlet,
   wherein the live wire of the power output terminal is selectively connected to the live wire output plug bush of the power output plug jack via the first normally closed switch to constitute a group of live wire conductors at a power output side,
   wherein the neutral wire of the power output terminal is selectively connected to the neutral wire output plug bush of the power output plug jack via a second normally closed switch to constitute a group of neutral wire conductors at the power output side,
   wherein the permanent magnet is located above or below the magnetic core in the trip coil,
   wherein the permanent magnet is aligned in line with the magnetic core in the trip coil,
   wherein the permanent magnet is mounted a predetermined distance from the magnetic core in the trip coil so that when there is no current in the trip coil, the magnetic core in the trip coil will not be drawn by the permanent magnet,
   wherein, when the reset button is at a trip position, the power live wire output terminal is connected to the live wire output plug bush of the power output plug jack,
   wherein, when the reset button is at a reset position, the power live wire output terminal is connected to the live wire output plug bush of the power output plug jack, wherein, when the reset button is at a trip position, the power neutral wire output terminal is connected to the neutral wire output plug bush of the power output plug jack, and wherein, when the reset button is at reset position, the power neutral wire output terminal is connected to the neutral wire output plug bush of the power output plug jack.

2. The electric leakage detection protective circuit of claim 1, further comprising a third normally closed switch, wherein:

the trip coil further comprises a first end and a second end, the first end of the trip coil is connected to the live wire at the power output terminal via the first normally closed switch controlled by the electromagnetic lock mechanism in the outlet, the second end is connected to the neutral wire at the power output terminal via the second diode, the third normally closed switch and the second main circuit switch interlocked with the reset button, and the second end is electrically connected to the second normally closed switch controlled by the electromagnetic lock mechanism in the outlet, thus constituting a protective circuit with wrong wiring prevention function, and when a power source live wire and a power source neutral wire are connected to the power output terminal, the power source live wire is electrically connected to the power source neutral wire via the closed first normally closed switch, the trip coil with the magnetic core inside, the second diode connected to an end of the closed third normally closed switch, and an end of the closed second normally closed switch thereby creating a closed circuit which generates a magnetic field in the trip coil which draws the permanent magnet and the magnet core of the trip coil together, moves the electromagnetic lock mechanism in the outlet to open the first and second normally closed switches, disconnects the electric leakage detection protective circuit from the power source live wire and power source neutral wire, and disconnects the power output terminal of the electric leakage detection protective circuit from the live wire output plug bush and the neutral wire output plug bush of the power output plug jack.

3. The electric leakage detection protective circuit of claim 2, wherein, when the first and second normally closed switches open, the first and second main circuit switches close and a conductor at a power input terminal electrically connects to the live wire output plug bush of the power output plug jack.

4. The electric leakage detection protective circuit of claim 3 further comprising:

a power input terminal comprising a power input live wire;

a first power supply switch; and a second power supply switch, wherein an anode of the silicon controlled rectifier is connected to the power input live wire at the power input terminal via the first power supply switch, the trip coil and the second power supply switch, wherein a power input pin of the control chip is connected to the power input live wire at the power input terminal via the first rectifier diode, the resistor, the first power supply switch, the trip coil and the second power supply switch, wherein, when the reset button is at the trip position, the first and second power supply switches open, and the silicon controlled rectifier and the control chip do not have power and do not work, and wherein, when the reset button is at the reset position, the first and second power supply switches close, and the power input terminal supplies work power for the silicon controlled rectifier and the control chip.

5. The electric leakage detection protective circuit of claim 4 further comprising:

a fourth normally open switch controlled by the electromagnetic lock mechanism in the outlet;

a wrong wiring alarm lamp;

a second resistor; and a third diode, wherein, when the wrong wiring alarm lamp, the second resistor and the third diode are in serial connection, one end is connected to the live wire at the power output terminal and the other end is connected to the neutral wire at the power output terminal via the fourth normally open switch, and wherein, when the power source live wire and the power source neutral wire are connected to the power output terminal, the electromagnetic lock mechanism in the outlet moves to open the first and second normally closed switches and to close the fourth normally open switch so that the power source live wire is connected to the power source neutral wire via the third diode, the second resistor and the wrong wiring alarm lamp to form a closed circuit, and the wrong wiring alarm lamp is on to indicate wrong wiring.

6. The electric leakage detection protective circuit of claim 5, wherein:

the third normally closed switch is interlocked with the reset button, when the reset button is at the trip position, the third normally closed switch closes, when the reset button is pressed and is at the reset position, the third normally closed switch opens, and when the trip coil, the second diode and the third normally closed switch are in serial connection, one end is connected to the live wire at the power output terminal via the first normally closed switch and the other end is connected to the neutral wire at the power output terminal via the second normally closed switch.

7. The electric leakage detection protective circuit of claim 1 wherein:

when a power source line is connected to the power output side of the electric leakage detection protective circuit, the magnetic core moves toward the permanent magnet, and when there is a leakage current fault, the magnetic core moves away from the permanent magnet.

8. The electric leakage detection protective circuit of claim 2 wherein:

when the power source line is connected to the power output side of the electric leakage detection protective circuit, the magnetic core moves toward the permanent magnet, and when there is a leakage current fault, the magnetic core moves away from the permanent magnet.

9. An electric leakage detection protective circuit connected with an outlet which has a test button, a reset button, an electromagnetic lock mechanism, a power output plug jack having a live wire output plug bush and a neutral wire output plug bush, the circuit comprising:

a permanent magnet;

an induction coil for detecting leakage current;

a self-energizing coil for detecting low resistance fault;

a control chip;

a silicon controlled rectifier;

a first rectifier diode and a second rectifier diode;
a resistor;
a filter capacitor;
a trip coil with a magnetic core inside;
a power output terminal having a power live wire output terminal with a live wire and a power neutral wire output terminal with a neutral wire;
a first main circuit switch and a second main circuit switch, each interlocked with the reset button;
a switch interlocked with at least the reset button; and
a first normally closed switch and a second normally closed switch, each controlled by the electromagnetic lock mechanism in the outlet,
wherein the live wire of the power output terminal is selectively connected to the live wire output plug bush of the power output plug jack via the first normally closed switch to constitute a group of live wire conductors at a power output side,
wherein the neutral wire of the power output terminal is selectively connected to the neutral wire output plug bush of the power output plug jack via a second normally closed switch to constitute a group of neutral wire conductors at the power output side,
wherein the permanent magnet is aligned in line with the magnetic core in the trip coil,
wherein the permanent magnet is mounted a predetermined distance from the magnetic core in the trip coil so that when there is no current in the trip coil, the magnetic core in the trip coil will not be drawn by the permanent magnet,
wherein, when a power source line is connected to the power output side of the electric leakage detection protective circuit, the magnetic core slides toward the permanent magnet, and
wherein, when there is a leakage current fault, the magnetic core slides away from the permanent magnet.

10. An electric leakage detection protective circuit connected with an outlet which has a test button, a reset button, an electromagnetic lock mechanism, a power output plug jack having a live wire output plug bush and a neutral wire output plug bush, the circuit comprising:
a permanent magnet;
an induction coil for detecting leakage current;
a self-energizing coil for detecting low resistance fault;
a control chip;
a silicon controlled rectifier;
a first rectifier diode and a second rectifier diode;
a resistor;
a filter capacitor;
a trip coil with a magnetic core inside;
a power output terminal having a power live wire output terminal with a live wire and a power neutral wire output terminal with a neutral wire;
a first main circuit switch and a second main circuit switch, each interlocked with the reset button;
a switch interlocked with at least the test button; and
a first normally closed switch and a second normally closed switch, each controlled by the electromagnetic lock mechanism in the outlet,
wherein the live wire of the power output terminal is selectively connected to the live wire output plug bush of the power output plug jack via the first normally closed switch to constitute a group of live wire conductors at a power output side,
wherein the neutral wire of the power output terminal is selectively connected to the neutral wire output plug bush of the power output plug jack via a second normally closed switch to constitute a group of neutral wire conductors at the power output side,
wherein the permanent magnet is aligned in line with the magnetic core in the trip coil,
wherein the permanent magnet is mounted a predetermined distance from the magnetic core in the trip coil so that when there is no current in the trip coil, the magnetic core in the trip coil will not be drawn by the permanent magnet,
wherein, when a power source line is connected to the power output side of the electric leakage detection protective circuit, the magnetic core slides toward the permanent magnet, and
wherein, when there is a leakage current fault, the magnetic core slides away from the permanent magnet.

11. The electric leakage detection protective circuit of claim 1, wherein the switch interlocked with at least the reset button is further interlocked with the test button.

12. The electric leakage detection protective circuit of claim 9, wherein the switch interlocked with at least the reset button is further interlocked with the test button.

* * * * *